United States Patent [19]

Moy

[11] Patent Number: 5,736,258

[45] Date of Patent: Apr. 7, 1998

[54] FILM EXTRUDED FROM AN IN SITU BLEND OF ETHYLENE COPOLYMERS

[75] Inventor: Francis H. Moy, Belle Mead, N.J.

[73] Assignee: Union Carbide Chemicals & Plastics Technology Corporation, Danbury, Conn.

[21] Appl. No.: 675,596

[22] Filed: Jul. 3, 1996

Related U.S. Application Data

[60] Provisional application No. 60/006,270, Nov. 7, 1995.

[51] Int. Cl.$^6$ .................................................. B32B 27/32
[52] U.S. Cl. ........................ 428/523; 428/500; 428/910
[58] Field of Search .............................. 428/500, 523, 428/910; 525/240

[56] References Cited

U.S. PATENT DOCUMENTS

| | | | |
|---|---|---|---|
| 4,814,135 | 3/1989 | Heitz | 264/564 |
| 5,405,901 | 4/1995 | Daniell et al. | 525/53 |

FOREIGN PATENT DOCUMENTS

| | | |
|---|---|---|
| 404368 | 12/1990 | European Pat. Off. . |

Primary Examiner—E. Rollins Buffalow
Attorney, Agent, or Firm—Saul R. Bresch

[57] ABSTRACT

A shrink film comprising a blend of copolymers of ethylene and one or more alpha-olefins having 3 to 12 carbon atoms formed in situ, said blend having a melt index in the range of about 0.2 to about 3.5 grams per 10 minutes; a melt flow ratio in the range of about 50 to about 175; a molecular weight in the range of about 90,000 to about 225,000; a Mw/Mn ratio of at least about 8; and a density in the range of 0.910 to 0.940 gram per cubic centimeter, said shrink film being formed at a blow up ratio in the range of about 2:1 to about 6:1 and having the following properties:

(i) at about 135 degrees C., a shrinkage of at least about 50 percent in the machine direction and zero or positive shrinkage in the transverse direction;

(ii) melt stress is zero or positive kilopascals; and (iii) a cooled stress of at least about $0.35 \times 10^3$ kilopascals.

7 Claims, No Drawings

FILM EXTRUDED FROM AN IN SITU BLEND OF ETHYLENE COPOLYMERS

This application claims the benefit of U.S. Provisional application numbered 60/006,270 filed on Nov. 7, 1995.

TECHNICAL FIELD

This invention relates to shrink film extruded from a blend of ethylene copolymers prepared in a series of polymerization reactors.

BACKGROUND INFORMATION

For many years, high pressure low density polyethylenes, which are highly branched polymers, were considered to be the resin of choice for commercial shrink film applications. The key property that facilitates the use of high pressure low density polyethylene for these applications is the long chain branching. The long chain branching makes possible the development of high melt stresses, which can be frozen into the film at the frost line during tubular film extrusion. In other words, sufficient strain hardening occurs during tubular film extrusion, for example, to generate in the film the frozen stresses that are required for shrink film applications. Under shrink tunnel conditions, the frozen-in stresses cause the film to shrink around the item to be packaged thus securing it firmly. These resins also have a relatively low stress relaxation rate, which facilitates a retention of the shrink forces needed to provide support for the packaged goods.

Unlike high pressure low density polyethylene, narrow molecular weight distribution linear low density polyethylene commonly used for tubular film extrusion has only short chain branching, the branches corresponding in length to the alpha-olefin that is copolymerized with ethylene to produce it. Without long chain branching, however, narrow molecular weight distribution linear low density polyethylene stresses relax too rapidly during melt extrusion to provide the high melt stresses, which can be frozen into the film. This is particularly true of the transverse direction of the narrow molecular weight distribution linear low density polyethylene film, which is stretched much less than the machine direction during film extrusion and, therefore, has virtually no shrinkage in that direction. As a result, narrow molecular weight distribution linear low density polyethylene is unacceptable for shrink film application because it sags around the material to be packaged instead of holding it securely.

Manufacturers of linear low density polyethylene (LLDPE) were, therefore, seeking to identify an LLDPE, which was suitable for shrink film applications; was easier to process than the high pressure low density polyethylene resins; and, finally, would result in a film, which would outperform high pressure resin films in terms of those properties most desirable in shrink films. This was accomplished in U.S. Pat. No. 4,814,135. In this patent, it was found that, in order to achieve a shrinkage of at least about 10 percent in the important transverse direction, a high weight average molecular weight of at least 250,000 together with a minor mount of a molecular weight species of at least about 500,000 was, among other defined parameters, necessary. It would be economically advantageous to be able to provide a shrink film having a transverse directional shrinkage of zero or positive a narrow blow up ratio, but at a much lower molecular weight, for the reason that extrusion processability is facilitated thereby.

DISCLOSURE OF THE INVENTION

An object of this invention, therefore, is to provide a relatively low molecular weight shrink film having a transverse directional shrinkage of zero or positive at a narrow blow up ratio. Other objects and advantages will become apparent hereinafter.

According to the present invention such shrink films have been discovered, the films being extruded from an in situ blend of polymers produced in two reactors connected in series. Steps and conditions, which can be used to provide the in situ blend, are described below.

The shrink film comprises a blend of copolymers of ethylene and one or more alpha-olefins having 3 to 12 carbon atoms formed in situ, said blend having a melt index in the range of about 0.2 to about 3.5 grams per 10 minutes, and preferably about 0.5 to about 3.5 grams per 10 minutes; a melt flow ratio in the range of about 50 to about 175; a molecular weight in the range of about 90,000 to about 225,000; a Mw/Mn ratio of at least about 8; and a density in the range of 0.910 to 0.940 gram per cubic centimeter, said shrink film being formed at a blow up ratio in the range of about 2:1 to about 6:1 and having the following properties:

(i) at about 135 degrees C., a shrinkage of at least about 50 percent in the machine direction and zero or positive shrinkage in the transverse direction;

(ii) melt stress is zero or positive kilopascals; and (iii) a cooled stress of at least about $0.35 \times 10^3$ kilopascals.

DESCRIPTION OF THE PREFERRED EMBODIMENT(S)

The gauge or thickness of the shrink film can be in the range of about 0.5 to about 6 mils, and is preferably in the range of about 1 to about 2.5 mils. The optimum gauge is about 1.2 mils.

The shrink films can be produced by various extrusion techniques such as blown film extrusion and slot cast biaxial orientation extrusion. Tubular film extrusion is preferred, particularly air cooled blown tubular film extrusion. Typical apparatus and a procedure for blown tubular film extrusion is described below. The minimum values for critical shrink film properties are as follows:

(i) Shrinkage at about 135° C. (approximate shrink tunnel temperature) in the machine direction is at least about 50 percent, and, in the transverse direction, zero or positive shrinkage and preferably zero to about 40 percent.

(ii) Shrink forces with the regard to melt stress is zero or positive kilopascals; preferably about 14 to about 103 kilopascals; and most preferably about 35 to about 69 kilopascals.

(iii) Cooled stress is at least about $0.35 \times 10^3$ kilopascals and is preferably about $0.85 \times 10^3$ to about $2 \times 10^3$. The only upper limits for these film properties are those that can be practically achieved.

The blend, which is used in the extruder, can be produced in two staged reactors connected in series wherein a mixture of resin and catalyst precursor is transferred from the first reactor to the second reactor in which another copolymer is prepared and blends in situ with the copolymer from the first reactor. The process is generally described, for example, in U.S. Pat. Nos. 5,047,468 and 5,126,398; however, the conditions have to be adjusted to provide the desired properties in the in situ blend.

The copolymers produced in each of the reactors are copolymers of ethylene and at least one alpha-olefin comonomer. The relatively high molecular weight copolymer is produced in what is referred to as the high molecular weight reactor, and the relatively low molecular weight copolymer is produced in what is referred to as the low molecular weight reactor. The alpha-olefin comonomer(s), which can be present in both of the reactors can have 3 to 12 carbon atoms, and preferably have 3 to 8 carbon atoms. The alpha-olefins are exemplified by propylene, 1-butene, 1-hexene, 4-methyl-1-pentene, or 1-octene. Any of the aforementioned comonomers can be used in either reactor. Preferred comonomer combinations are 1-butene/1-butene; 1-butene/1-hexene; 1-hexene/1-butene; and 1-hexene/1-hexene combinations.

The magnesium/titanium based catalyst system, which can be used to make the in situ blend, can be exemplified by the catalyst system described in U.S. Pat. No. 4,302,565 although the precursor is preferably unsupported. Another preferred catalyst system is one where the precursor is formed by spray drying such as the system described in U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. About 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylalumluum, dibutylaluminum chloride, diethylaluminum chloride, and ethylaluminum sesquichioride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(i) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(ii) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (iii) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The entire catalyst system, which includes the precursor or activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is preferably prepared in the first reactor, and the relatively high melt index (or low molecular weight) copolymer is prepared in the second reactor. This can be referred to as the forward mode. Alternatively, the relatively low molecular weight copolymer can be prepared in the first reactor and the relatively high molecular weight copolymer can be prepared in the second reactor. This can be referred to as the reverse mode.

The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

In the high molecular weight reactor:

Because of the low values, instead of melt index, flow index is determined and those values are used in this specification. The flow index can be in the range of about 0.01 to about 30 grams per 10 minutes, and is preferably in the range of about 0.2 to about 6 grams per 10 minutes. The molecular weight of this polymer is, generally, in the range of about 400,000 to about 480,000. The density of the copolymer can be 0.860 to 0.940 gram per cubic centimeter, and is preferably in the range of 0.900 to 0.930 gram per cubic centimeter. The melt flow ratio of the polymer can be in the range of about 20 to about 70, and is preferably about 22 to about 45.

In the low molecular weight reactor:

A relatively high melt index (or low molecular weight) copolymer is prepared in this reactor. The high melt index can be in the range of about 50 to about 3000 grams per 10 minutes, and is preferably in the range of about 100 to about 1500 grams per 10 minutes. The molecular weight of the high melt index copolymer is, generally, in the range of about 14,000 to about 30,000. The density of the copolymer prepared in this reactor can be 0.900 to 0.970 gram per cubic centimeter, and is preferably in the range of 0.905 to 0.945 gram per cubic centimeter. The melt flow ratio of this copolymer can be in the range of about 20 to about 70, and is preferably about 20 to about 45.

The blend or final product, as removed from the second reactor, can have a melt index in the range of about 0.2 to about 3.5 grams per 10 minutes, and preferably has a melt index in the range of about 0.5 to about 3.5 grams per 10 minutes. The melt flow ratio can be in the range of about 50 to about 175. The molecular weight of the final product can be in the range of about 90,000 to about 225,000, and is preferably in the range of about 120,000 to about 200,000. The density of the blend can be in the range of 0.910 to 0.940 gram per cubic centimeter, and is preferably in the range of 0.918 to 0.926 gram per cubic centimeter.

It will be understood that generally the in situ blend can be characterized as a multimodal resin, usually bimodal or trimodal. In some cases, however, the two components making up the blend are sufficiently close in average molecular weight that there is no discernible discontinuity in the molecular weight curve.

The properties of these resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements. The broad molecular weight distribution is reflected in an Mw/Mn ratio of at least about 8, and is preferably at least about 10. The only upper limit is the bounds of practicality. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 0.5:1 to about 2:1.

The catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index, reactor:

The mole ratio of alpha-olefin to ethylene can be in the range of about 0.05:1 to about 0.4:1, and is preferably in the range of about 0.09:1 to about 0.26:1. The mole ratio of hydrogen (if used) to ethylene can be in the range of about 0.0001:1 to about 0.3:1, and is preferably in the range of about 0.001:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor:

The mole ratio of alpha-olefin to ethylene can be in the range of about 0.1:1 to about 0.6:1, and is preferably in the range of about 0.2:1 to about 0.45:1. The mole ratio of hydrogen to ethylene can be in the range of about 1:1 to about 3:1, and is preferably in the range of about 1.6:1 to about 2.2:1. The operating temperature is generally in the range of about 70° C. to about 100° C. As mentioned above, the temperature is preferably varied with the desired density.

The pressure is generally the same in both the first and second reactors. The pressure can be in the range of about 200 to about 450 psi and is preferably in the range of about 280 to about 350 psig. A typical fluidized bed reactor can be described as follows: The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical and preferred catalyst system is one where the precursor is formed by spray drying and is used in slurry form. Such a catalyst precursor, for example, contains titanium, magnesium, and an electron donor, and, optionally, an aluminum halide. The precursor is then introduced into a hydrocarbon medium such as mineral oil to provide the slurry form. See U.S. Pat. No. 5,290,745.

The in situ polyethylene blend can be produced using the following typical procedure:

Ethylene is copolymerized with 1-hexene and 1-butene. Trimethylaluminum (TMA) cocatalyst is added to each reactor during polymerization. The pressure in each reactor is 300 psia. Each polymerization is continuously conducted after equilibrium is reached.

Polymerization is initiated in the first reactor by continuously feeding the above catalyst precursor and cocatalyst, TMA, into a fluidized bed of polyethylene granules together with ethylene, 1-hexene, and hydrogen. The TMA is first dissolved in isopentane (5 percent by weight TMA). The resulting copolymer mixed with active catalyst is withdrawn from the first reactor and transferred to the second reactor using nitrogen as a transfer medium. The second reactor also contains a fluidized bed of polyethylene granules. Ethylene, 1-butene, and hydrogen are introduced into the second reactor where they come into contact with the copolymer and catalyst from the first reactor. Additional cocatalyst is also introduced. The product blend is continuously removed.

A typical procedure for preparing shrink film by blown tubular film extrusion is as follows: The extruder is equipped with a fluted mixing screw capable of providing the level of melt homogeneity that is found in current commercial tubular film extrusions. 3 inch and 6 inch bottom fed, spiral mandrel tubular film dies, each equipped with a 0.04 inch die pin, are used to extrude the polymer or copolymer. The size of the die orifice is maintained at 0.036 inch. The films are extruded at an 8 pound/hour/inch of die circumference die rate using a blow-up ratio (BUR) ranging (in the present invention) from about 2:1 to about 6:1, and preferably about 2.5:1 to about 4.5:1; melt temperatures in the range of about 175° C. to about 210° C.; and a frost line height of 12 inches.

Variations of these extrusion conditions to optimize film properties for specific applications can be made by anyone having ordinary skill in the art of shrink film extrusion.

The extruder can be, for example, a 1.5 or 3.5 inch extruder having a 3 inch (75 millimeter) die and a 40 mil (1.0 millimeter) gap. The thickness of the film provided and tested is 25 microns except in examples 1, 2 and 3 where it is 35, 50, and 65, respectively. The temperatures are as follows: barrel profile=190° C.; adapter=200° C.; die=210° C.; and melt=250° C. The screw speed is 120 revolutions per minute (rpm); the melt pressure is 158 bars; the extrusion rate is 22 kilograms per hour; and the drive current is 10 amperes.

Terms and properties mentioned are defined or determined as follows:

Machine direction is the direction in which the film web is pulled from the die of the film extruder.

Transverse direction is the direction of the web, which is perpendicular to the machine direction and parallel to the web.

Shrinkage (the percent change in film dimension) is determined as follows:

$$\text{Machine direction shrinkage (percent)} = \frac{LiMD - LsMD}{LiMD} \times 100$$

$$\text{Transverse direction shrinkage (percent)} = \frac{LiTD - LsTD}{LiMD} \times 100$$

wherein

LiMD=initial machine direction length

LsMD=machine direction length after shrinkage

LiTD=initial transverse direction length

LsTD=transverse direction length after shrinkage.

Another way to determine shrinkage is as follows: A 3 inch×3 inch film specimen is cut so that the MD and TD directions are parallel to the sides of the specimen. The specimen is placed in a circulating oil bath at 124° C. for 60 seconds using a suitable holder such that the film can shrink freely, but not cuff. The specimen is removed from the bath and quenched briefly in water. The MD and TD shrinkage is obtained by measuring the specimen in the MD and TD direction and making the following calculation:

$$\text{Percent Shrinkage} = \frac{\text{Initial Width minus Final Width}}{\text{Initial Width}} \times 100$$

Melt stresses are stresses frozen into the film at the frost line. Cooled stresses are crystalline stresses remaining in the solidified film. Melt stress and cooled stress are determined as follows: A film specimen one inch wide is clamped in a set of "Instron" jaws so that they are six inches apart. With the "Instron" jaws stationary, a 500-watt radiant heater is swung in at a given distance from the film causing the film to melt and start to shrink. The stress in the melt state is recorded as a load on the "Instron" chart. As the melt stress begins to decay, the heater is removed and the film is allowed to cool. MD and TD directions. The values are given in kilopascals (KPa).

Melt strength is the resistance to deformation in the melt. It can be defined as that property which resists thinning and subsequent hole formation (burnthrough) when subjected to the shrink stresses released while the film is in the molten state in the oil bath at an elevated temperature (usually 124° C.). Then, the time for the film to pull apart under the weight attached is recorded as the melt strength in seconds. For example, for a four mil sample, an 18 gram weight is usually used which gives a stress of 8.3 psi in oil. Failure time is usually between to 10 to 70 seconds. Temperatures and weights are varied according to film thickness and melting point.

Melt Flow is determined under ASTM D-1238-79 in grams per 10 minutes. It is similar to melt index. Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining melt index, and reported as grams per 10 minutes. Melt flow ratio is the ratio of flow index to melt index.

Density is determined under ASTM D-1505. A plaque is made in accordance with ASTM D-1928, Procedure C, and conditioned for one hour at 100° C. to approach equilibrium crystallinity. Measurement for density is then made in a density gradient column and density values are reported in kilogram per cubic meter.

Film gauge is the thickness of the film. The value can be given in microns or mils.

Blow-up ratio is the ratio of die diameter to bubble diameter. The bubble diameter is determined as follows: 2×layflat/π. The "layflat" refers to the width of a flattened bubble.

Molecular weight distribution is determined via Size Exclusion Chromatography using a Waters™ 150 C with trichlorobenzene as solvent at 140 degrees C. with a broad molecular weight distribution standard and broad molecular weight distribution calibration method.

Die rate is defined as pounds per hour per inch of die circumference.

Frost line height is that distance off of the base of the die during which the polymer undergoes a phase transformation from a viscous liquid to a solid.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend. The additives can be added to the resector(s) or extruder via a suitable medium such as a conventional hydrocarbon diluent.

Further, the blend can be, in turn, blended with other polyethylenes, such as high pressure low density polyethylenes (HP-LDPE), for use in shrink films in varying amounts depending on the properties desired. The melt index of the HP-LDPE can be in the range suitable for blown films and slot cast films, preferably about 0.15 to about 6 grams per 10 minutes.

The shrink film of the invention, in addition to having the frozen stresses so important in shrink film applications, has the following advantages:

(i) the excellent shrink properties of in situ blends, particularly those containing significant amounts of 1-butene and/or 1-hexene;

(ii) the blends can be extruded on a standard LLDPE line or a conventional high pressure (HP) LDPE line employing narrow die gaps, e.g., 35 mils, and at normal blow-up ratios, e.g., 2:1 to 4:1; and (iii) there is an economic advantage through film downgauging compared to shrink film made with HP-LDPE blends or HP-LDPE/LLDPE blends. This economic advantage is captured in the shrink film market by capitalizing on the inherent film toughness characterized by films extruded from an in situ blend of ethylene copolymers.

Patents mentioned in this specification are incorporated by reference herein.

The invention is illustrated by the following examples.

EXAMPLES

Two in situ blend resins are prepared, i.e., Resin A and Resin B. The reaction conditions for the preparation of Resin A are set forth in Table 1 and the reaction conditions for the preparation of Resin B are set forth in Table II. Resin A is prepared in the reverse mode. Resin B is prepared in the standard mode.

In the reverse mode, the low molecular weight copolymer is prepared in the first reactor; transferred together with active catalyst to the second reactor; and blended in situ with the high molecular weight copolymer, which is prepared in the second reactor. In the standard mode, the high molecular weight copolymer is prepared in the first reactor; transferred together with active catalyst to the second reactor; and blended in situ with the low molecular weight copolymer, which is prepared in the second reactor.

The catalyst precursor is formed by spray drying and is used in slurry form. It contains titanium, magnesium, and aluminum halides, and an electron donor, and is attached to the surface of silica. The precursor is then introduced into a hydrocarbon medium such as mineral oil to provide the slurry form. See U.S. Pat. No. 5,290,745 ('745). The catalyst precursor and method of preparing same used in the examples is the same composition and preparation method as example 1 of '745. For low density operation, such as that described herein, a reduced catalyst precursor is used. Typically, the molar ratio of diethylaluminum chloride (DEAC) to tetrahydrofuran (THF) is 0.45 and the molar ratio of tri-n-hexylaluminum to tetrahydrofuran is 0.20. The addition of diethylaluminum chloride and tri-n-hexylaluminum (TnHAl) is achieved by an in-line reduction system in which the diethylaluminum chloride and tri-n-hexylaluminum are fed to the reactor concurrently with the catalyst precursor in order to produce a reduced catalyst.

Ethylene is copolymerized with a comonomer in each of two fluidized bed reactors. Each polymerization is continuously conducted after equilibrium is reached under conditions set forth in the Tables.

Polymerization is initiated in the first reactor by continuously feeding the above catalyst precursor and cocatalyst, trimethylaluminum (TMA), into a fluidized bed of polyethylene granules together with ethylene, a comonomer, and hydrogen. The cocatalyst is first dissolved in isopentane (5 percent by weight cocatalyst). Higher concentrations of cocatalyst in solution can also be used as well as using the cocatalyst neat. The resulting copolymer mixed with active catalyst is withdrawn from the first reactor and transferred to the second reactor using either nitrogen or second reactor cycle gas as a transfer medium. The second reactor also contains a fluidized bed of polyethylene granules. Again, ethylene, a comonomer, and hydrogen are introduced into the second reactor where the gases come into contact with the copolymer and catalyst from the first reactor. Additional cocatalyst is also introduced. The product blend is continuously removed.

Resin A has a melt index of 0.7 gram per 10 minutes; a flow index of 68.0 grams per 10 minutes; a melt flow ratio of 98.0; and a density of 0.923 gram per cubic centimeter. Resin B has a melt index of 0.7 gram per 10 minutes; a flow index of 69.0 grams per 10 minutes; a melt flow ratio of 98.0; and a density of 0.922 gram per cubic centimeter.

Resin C is a high pressure low density polyethylene (HP-LDPE). It is a homopolymer of ethylene prepared by a conventional high pressure process. Resin C has a melt index of 2 grams per 10 minutes; a flow index of 120 grams per 10 minutes; a melt flow ratio of 60; and a density of 0.920 gram per cubic centimeter. Resin D is also an HP-LDPE, and is a homopolymer of ethylene prepared by a conventional high pressure process. Resin D has a melt index of 0.9 gram per 10 minutes; a flow index of 73 grams per 10 minutes; a melt flow ratio of 80; and a density of 0.920 gram per cubic centimeter.

In addition to polymerization conditions for Resin A in Table I and Resin B in Table II, film extrusion conditions and film properties are given in Tables III and IV.

The equipment for extruding the blends into film in Table III is a 40 millimeter (1½ inches) Old Sterling™ extruder having a Barrier™ screw; a 50 millimeter (2 inch) die; and a 1 millimeter (40 mil) die gap. The screw rpm is a variable.

The equipment for extruding the blends into film in Table IV is a 90 millimeter (3½ inches) Gloucester™ extruder having a DSB II screw; a 150 millimeter (6 inch) die; and a 0.9 millimeter (35 mil) die gap. The die rate is 10 pounds per hour per inch.

TABLE I

| reaction conditions | reactor I | reactor II |
| --- | --- | --- |
| temperature (°C.) | 85 | 72 |
| pressure (psia) | 298 | 251 |
| C2 partial pressure (psia) | 66.7 | 53 |
| H2/C2 molar ratio | 1.96 | 0.018 |
| C4/C2 molar ratio | 0.28 | 0 |
| C6/C2 molar ratio | 0 | 0.166 |
| C2 feed (lbs/hr) | 15250 | 10639 |
| H2 feed (lbs/hr) | 19.3 | 0.065 |
| C4 feed(lbs/hr) | 1186 | 0 |
| C6 feed (lbs/hr) | 0 | 2964 |
| cocatalyst | 10% TMA | 10% TMA |
| catalyst feed rate (lbs/hr) | 8.87 | |
| production rate (lbs/hr) | 16072 | 12725 |
| total production rate (lbs/hr) | — | 28797 |
| ethylene split | 0.589 | 0.411 |
| titanium split | 0.591 | 0.409 |
| fluidized bulk density (lbs/cu ft) | 15.54 | 14.4 |
| bed weight (lbs) | 62210 | 60225 |
| bed level (ft) | 39.3 | 37.2 |
| bed volume (cu/ft) | 4003 | 4182 |
| residence time (hrs) | 3.871 | 2.091 |
| STY (lbs/hr/cu ft) | 4.01 | 3.04 |

TABLE II

| reaction conditions | reactor I | reactor II |
| --- | --- | --- |
| temperature (°C.) | 70 | 85 |
| pressure (psia) | 305 | 306 |
| C2 partial pressure (psia) | 23.5 | 84.8 |
| H2/C2 molar ratio | 0.057 | 1.79 |
| C4/C2 molar ratio | 0 | 0.23 |
| C6/C2 molar ratio | 0.147 | 0.006 |
| C2 feed (lbs/hr) | 12816 | 15492 |
| H2 feed (lbs/hr) | 0.25 | 59 |
| C4 feed (lbs/hr) | 0 | 1606 |
| C6 feed (lbs/hr) | 2037 | 0 |
| cocatalyst | 10% TMA | 10% TMA |
| cocatalyst feed rate (lbs/hr) | 36 | 13 |
| hexane feed rate (lbs/hr) | 540 | 0 |
| catalyst feed rate (lbs/hr) | 19.6 | — |
| production rate (lbs/hr) | 14600 | 16300 |
| total production rate (lbs/hr) | — | 30900 |
| ethylene split | 0.453 | 0.547 |
| titanium split | 0.490 | 0.50 |
| SGV (ft/sec) | 2.07 | 2.2 |
| fluidized bulk density (lbs/cu ft) | 12.42 | 16.98 |
| bed weight (lbs) | 52161 | 72962 |
| bed level (ft) | 39.1 | 39.7 |
| bed volume (cu ft) | 4200 | 4297 |
| residence time (hrs) | 3.573 | 2.361 |
| % condensing (wt) | 4.4 | 0 |
| STY (lbs/hr/cu ft) | 3.48 | 3.79 |

TABLE III

| example | RESIN | BUR | GAUGE (MILS) | DIE RATE LBS/HR/IN | LBS/HR |
| --- | --- | --- | --- | --- | --- |
| 1 | C | 3:1 | 1.5 | 7.3 | 46 |
| 2 | C | 3:1 | 2 | 11.9 | 75 |
| 3 | A | 3.5:1 | 1.5 | 7.6 | 48 |
| 4 | A | 4:1 | 1.5 | 9.4 | 59 |
| 5 | A | 4:1 | 2 | 9.4 | 59 |
| 6 | A | 4:1 | 2.5 | 9.4 | 59 |

| example | RESIN | MD SHRINK (%) | TD SHRINK (%) | MD HOT STRESS (PSI) | MD COLD STRESS (PSI) |
| --- | --- | --- | --- | --- | --- |
| 1 | C | 85 | 23 | 19.4 | 258.9 |
| 2 | C | 80 | 25 | 11.8 | 208.3 |
| 3 | A | 80 | 10 | 6 | 272.8 |
| 4 | A | 77 | 17 | 4.9 | 241.3 |
| 5 | A | 73 | 17 | 4.8 | 232.2 |
| 6 | A | 70 | 20 | 3.6 | 246 |

Extrusion conditions:

| example | 1 | 2 | 3 | 4 | 5 | 6 |
| --- | --- | --- | --- | --- | --- | --- |
| resin | C | C | A | A | A | A |
| gauge (mils) | 1.5 | 2 | 1.5 | 1.5 | 2 | 2.5 |
| (mm) | (.04) | (.05) | (.04) | (.04) | (.05) | (.06) |
| BUR | 3:1 | 3:1 | 3.5:1 | 4:1 | 4.0:1 | 4.0:1 |
| Screw rpm | 90 | 154 | 120 | 152 | 152 | 152 |
| Melt Temp (°C.) | 199 | 204 | 210 | 216 | 216 | 216 |
| Head Pressure (psi) | 2200 | 1300 | 2000 | 2300 | 2300 | 2300 |
| (MPa) | (8.3) | (9.0) | (13.8) | (15.9) | (15.9) | (15.9) |
| Amps | 7.0 | 8.5 | 10 | 11 | 11.0 | 11.0 |
| Die Rate | | | | | | |
| (lbs/hr/in) | 7.3 | 11.9 | 7.6 | 9.4 | 9.4 | 9.4 |
| (kg/hr/cm) | (1.3) | (2.1) | (1.4) | (1.7) | (1.7) | (1.7) |

TABLE III-continued

| | | | | | | |
|---|---|---|---|---|---|---|
| Specific Output Rate | | | | | | |
| (lbs/hr/rpm) | 0.51 | 0.49 | 0.4 | 0.39 | 0.39 | 0.39 |
| (kg/hr/rpm) | (0.23) | (0.22) | (0.18) | (0.18) | (.18) | .18) |

TABLE IV

| | | Resin B | | Resin D | |
|---|---|---|---|---|---|
| MI (g/10 min) | | 0.7 | | 0.9 | |
| HLMI (g/10 min) | | 69.0 | | 73 | |
| MFR | | 98.0 | | 80.0 | |
| Density (g/cc) | | 0.922 | | 0.920 | |
| Extrusion Conditions: | | | | | |
| Melt Temperature (°C.) | | 218 | | 207 | |
| Head Pressure psi (Mpa) | | 3900 (26.9) | | 2900 (20.0) | |
| Amps | | 110 | | 90 | |
| Die Rate lbs/hr/in (kg/hr/cm) | | 10.0 (1.8) | | 10.3 (1.8) | |
| Specific Output Rate lbs/hr/rpm (kg/hr/rpm) | | 3.8 (1.7) | | 4.3 (2.0) | |
| Bubble Stability | | GOOD | | GOOD | |
| Melt Fracture | | NONE | | NONE | |
| Film Properties: 1.25 mil film (30 micron), 2.5:1 BUR | | | | | |
| Tensile Strength psi (MPa) | MD | 5000 | (34.5) | 3400 | (23.4) |
| | TD | 3600 | (24.8) | 2700 | (18.6) |
| Elongation at break (%) | MD | 560 | | 260 | |
| | TD | 800 | | 540 | |
| Secant Modulus (psi) (MPa) | MD | 36500 | (255) | 27400 | (186) |
| | TD | 42700 | (296) | 33400 | (228) |
| Elmendorf Tear grams/mil (N/mm) | MD | 133 | (51.2) | 198 | (77.0) |
| | TD | 1000 | (385) | 163 | (62.8) |
| Shrinkage (%) | MD | 76% | | 78% | |
| | TD | 0% | | 20% | |
| Hot Melt Stress (psi)(kPa) | MD | 3.3 | (22.8) | 4.5 | (31.0) |
| Cold Stress (psi)(kPa) | MD | 124 | (855) | 236 | (1627) |
| Puncture energy/mil (J/mm) | | 20.0 | (89) | 14.7 | (65.4) |
| Dart Drop (g) | | 150 | | 97 | |
| Haze (%) | | 35.0 | | 5.0 | |
| Gloss (45 deg.) | | 18.0 | | 68.0 | |
| Film Properties: 2.25 mil film (55 micron), 2.5:1 BUR | | | | | |
| Tensile Strength psi (MPa) | MD | 4700 | (32.4) | 2900 | (20.0) |
| | TD | 3900 | (26.9) | 2800 | (19.3) |
| Elongation at break (%) | MD | 760 | | 475 | |
| | TD | 900 | | 660 | |
| Secant Modulus (psi) (MPa) | MD | 35600 | (248) | 27700 | (193) |
| | TD | 42000 | (290) | 31500 | (220) |
| Elmendorf Tear grams/mil (N/mm) | MD | 190 | (73.2) | 141 | (54.3) |
| | TD | 500 | (192.5) | 170 | (65.5) |
| Shrinkage (%) | MD | 66% | | 68% | |
| | TD | 8% | | 23% | |
| Hot Melt Stress (psi)(kPa) | MD | 2.7 | (18.6) | 5.6 | (38.6) |
| Cold Stress (psi)(kPa) | MD | 203 | (1400) | 208 | (1434) |
| Puncture energy/mil (J/mm) | | 18.0 | (80.1) | 14.0 | (62.3) |
| Dart Drop (g) | | 230 | | 170 | |
| Haze (%) | | 34.0 | | 4.7 | |
| Gloss (45 deg.) | | 22.0 | | 81.0 | |
| Film Properties: 1.25 mil film (30 micron), 3.0:1 BUR | | | | | |
| Tensile Strength psi (MPa) | MD | 4600 | (31.7) | 3400 | (23.4) |
| | TD | 3800 | (26.2) | 3300 | (22.8) |
| Elongation at break (%) | MD | 600 | | 275 | |
| | TD | 800 | | 600 | |
| Secant Modulus (psi) (MPa) | MD | 35000 | (241) | 27000 | (186) |
| | TD | 44000 | (303) | 30000 | (207) |
| Elmendorf Tear grams/mil (N/mm) | MD | 200 | (77.0) | 125 | (48.1) |
| | TD | 850 | (327.3) | 200 | (77.0) |
| Shrinkage (%) | MD | 75% | | 80% | |
| | TD | 10% | | 40% | |
| Hot Melt Stress (psi)(kPa) | MD | 2.6 | (17.9) | 4.8 | (33.1) |
| Cold Stress (psi)(kPa) | MD | 138 | (952) | 195 | (1345) |
| Puncture energy/mil (J/mm) | | 19.0 | (84.6) | 16.7 | (74.3) |
| Dart Drop (g) | | 125 | | 103 | |
| Haze (%) | | 32.0 | | 4.6 | |
| Gloss (45 deg,) | | 20.0 | | 72.0 | |
| Film Properties: 2.25 mil film (55 micron), 3.0:1 BUR | | | | | |
| Tensile Strength psi (MPa) | MD | 4400 | (30.3) | 3800 | (26.2) |
| | TD | 4100 | (28.3) | 3200 | (22.1) |
| Elongation at break (%) | MD | 800 | | 430 | |
| | TD | 900 | | 600 | |
| Secant Modulus (psi) (MPa) | MD | 36000 | (248) | 27600 | (193) |
| | TD | 38000 | (262) | 27600 | (193) |
| Elmendorf Tear grams/mil (N/mm) | MD | 245 | (94.3) | 114 | (43.9) |
| | TD | 500 | (192.5) | 145 | (55.8) |
| Shrinkage (%) | MD | 63% | | 70% | |
| | TD | 16% | | 40% | |
| Hot Melt Stress (psi)(kPa) | MD | 2.0 | (13.8) | 2.0 | (13.8) |
| Cold Stress (psi)(kPa) | MD | 191 | (1317) | 69 | (478) |
| Puncture energy/mil (J/mm) | | 18.0 | (80.1) | 16.5 | (73.4) |
| Dart Drop (g) | | 260 | | 191 | |
| Haze (%) | | 33.0 | | 4.2 | |
| Gloss (45 deg.) | | 22.0 | | 79.0 | |
| Film Properties: 1.25 mil film (30 micron), 3.5:1 BUR | | | | | |
| Tensile Strength psi (MPa) | MD | 4600 | (31.7) | 3300 | (22.8) |
| | TD | 3200 | (22.1) | 3300 | (22.8) |
| Elongation at break (%) | MD | 600 | | 300 | |
| | TD | 700 | | 500 | |
| Secant Modulus (psi) (MPa) | MD | 37000 | (255) | 25000 | (172) |
| | TD | 41000 | (283) | 29600 | (206) |
| Elmendorf Tear grams/mil (N/mm) | MD | 215 | (82.8) | 75 | (28.9) |
| | TD | 840 | (327) | 175 | (67.4) |

TABLE IV-continued

| | | | | | |
|---|---|---|---|---|---|
| Shrinkage | MD | 75% | | 77% | |
| (%) | TD | 20% | | 50% | |
| Hot Melt Stress (psi)(kPa) | MD | 2.1 | (14.5) | 3.8 | (26.2) |
| Cold Stress (psi)(kPa) | MD | 53 | (365) | 135 | (931) |
| Puncture energy/mil (J/mm) | | 17.0 | (75.7) | 17.0 | (75.7) |
| Dart Drop (g) | | 150 | | 127 | |
| Haze (%) | | 32.0 | | 4.5 | |
| Gloss (45 deg.) | | 20.0 | | 72.0 | |
| Film Properties: 2.25 mil film (55 micron), 3.5:1 BUR | | | | | |
| Tensile Strength psi (MPa) | MD | 4400 | (30.3) | 3000 | (20.7) |
| | TD | 3800 | (26.2) | 2800 | (19.3) |
| Elongation at break (%) | MD | 875 | | 480 | |
| | TD | 900 | | 580 | |
| Secant Modulus (psi) (MPa) | MD | 37900 | (261) | 26000 | (179) |
| | TD | 40700 | (281) | 27000 | (186) |
| Elmendorf Tear grams/mil (N/mm) | MD | 275 | (105.8) | 73 | (28.1) |
| | TD | 425 | (163.6) | 125 | (48.1) |
| Shrinkage (%) | MD | 60% | | 70% | |
| | TD | 30% | | 45% | |
| Hot Melt Stress (psi)(kPa) | MD | 2.0 | (13.8) | 7.3 | (50.3) |
| Cold Stress (psi)(kPa) | MD | 180 | (1241) | 216 | (1489) |
| Puncture energy/mil (J/mm) | | 16.0 | (71.2) | 16.0 | (71.2) |
| Dart Drop (g) | | 300 | | 185 | |
| Haze (%) | | 33.0 | | 4.8 | |
| Gloss (45 deg.) | | 22.0 | | 79.0 | |

Notes to Examples:
1. MI=melt index
2. HLMI=melt index
3. MFR=melt flow ratio
4. Bubble stability is determined by the speed of the line. The faster the speed (prior to failure) the better the bubble stability.
5. Dart impact (dart drop) is determined under ASTM D-1709, methods A and B. It is given in grams.
6. Elmendorf Tear is determined under ASTM D-1992. It is given in grams per mil. MD=machine direction
8. TD=transverse direction
9. Tensile Strength is measured in accordance with ASTM D-882.
10. Elongation is measured in accordance with ASTM D-882.
11. Tensile strength at yield point is measured in accordance with ASTM D-882.
12. Secant Modulus is measured in accordance with ASTM D-882.
13. Haze is determined under ASTM D-1003.
14. Gloss is determined under ASTM D-2457.
15. Melt fracture is determined by visually examining the film.

Each film is given a value from 1 to 9 with the value 1 being the worst case of melt fracture and the value 9 representing essentially no melt fracture as follows:
1=severely gross
2=gross
3=gross shark skin
4=severe shark skin
5=shark skin
6=rough surface
7=slightly rough surface
8=minor imperfection, but acceptable
9=essentially no melt fracture 16. Puncture resistance: the test is carried out with a metal cylinder, open at both ends, having a diameter of 75 millimeters and a length of 100 millimeters. One open end is covered with the sample film, which is held taut by a metal band surrounding that end of the cylinder (similar to a drum). The cylinder is placed in a vertical position with the film covered end up. Then, the film is pressed with the sharp point of a nail-like rod (5 millimeters in diameter and 150 millimeters in length) and a force is exerted against the film. When the film is broken, the force exerted is measured in grams.

17. STY (lbs/hr/cu ft) is the space time yield defined as the pounds per hour of polymer produced per cubic foot of fluidized bed.

I claim:

1. A shrink film comprising a blend of copolymers of ethylene and one or more alpha-olefins having 3 to 12 carbon atoms formed in situ, said blend having a melt index in the range of about 0.2 to about 3.5 grams per 10 minutes; a melt flow ratio in the range of about 50 to about 175; a molecular weight in the range of about 90,000 to about 225,000; a Mw/Mn ratio of at least about 8; and a density in the range of 0.910 to 0.940 gram per cubic centimeter, said shrink film being formed at a blow up ratio in the range of about 2:1 to about 6:1 and having the following properties:

(i) at about 135 degrees C., a shrinkage of at least about 50 percent in the machine direction and zero or positive shrinkage in the transverse direction;

(ii) melt stress is zero or positive kilopascals; and (iii) a cooled stress of at least about $0.35 \times 10^3$ kilopascals.

2. The film defined in claim 1 wherein the molecular weight of the blend is in the range of about 120,000 to about 225,000.

3. The film defined in claim 1 wherein the blend of copolymers is formed in a high molecular weight reactor and a low molecular weight reactor, the polymer formed in the high molecular weight reactor having a flow index in the range of about 0.2 to about 6 grams per 10 minutes and a density in the range of 0.900 to 0.930 gram per cubic centimeter and the polymer formed in the low molecular weight reactor having a melt index in the range of about 100 to about 1500 grams per 10 minutes and a density in the range of 0.905 to about 0.945 gram per cubic centimeter.

4. The film defined in claim 1 wherein the blend has a melt index in the range of about 0.5 to about 3.5 grams per 10 minutes.

5. The film defined in claim 1 wherein the blend has an Mw/Mn ratio of at least about 10.

6. A shrink film comprising a blend of copolymers of ethylene and one or more alpha-olefins having 3 to 8 carbon atoms formed in situ, said blend having a melt index in the range of about 0.5 to about 3.5 grams per 10 minutes; a melt flow ratio in the range of about 50 to about 175; a molecular weight in the range of about 130,000 to about 200,000; a Mw/Mn ratio of at least about 10; and a density in the range of 0.918 to 0.926 gram per cubic centimeter, said shrink film being formed at a blow up ratio in the range of about 2:1 to about 4.5:1 and having the following properties:

(i) at about 135 degrees C., a shrinkage of at least about 60 percent in the machine direction and of zero to about 40 percent in the transverse direction;

(ii) melt stress of about 14 to about $10^3$ kilopascals; and (iii) a cooled stress of about $0.85 \times 10^3$ to about $2 \times 10^3$ kilopascals, said film having been extruded to a gauge in the range of about 1 to about 3.5 mils and having been produced in situ by contacting ethylene and at least one alpha-olefin comonomer having 3 to 8 carbon atoms with a magnesium/titanium based catalyst system in each of two reactors connected in series, under polymerization conditions, wherein (a) the polymer formed in the high molecular weight reactor has a flow index in the range of about 0.2 to about 1 gram per 10 minutes and a density in the range of 0.900 to 0.930 gram per cubic centimeter and (b) the polymer formed in the low molecular weight reactor has a melt index in the range of about 100 to about 1500 grams per 10 minutes and a density in the range of 0.905 to 0.945 gram per cubic centimeter, the weight ratio of high molecular weight reactor polymer to the low molecular weight reactor polymer being in the range of about 0.5:1 to about 2:1.

7. The film defined in claim 6 wherein the blend is produced under the following conditions:

(i) in the high molecular weight reactor: the mole ratio of comonomer(s) to ethylene is in the range of about 0.05:1 to about 0.4:1 and the mole ratio of hydrogen, if used, to ethylene is in the range of about 0.0001:1 to about 0.3:1; and (ii) in the low molecular weight reactor: the mole ratio of comonomer(s) to ethylene is in the range of about 0.1:1 to about 0.6:1 and the mole ratio of hydrogen to ethylene is in the range of about 1:1 to about 2.5:1.

* * * * *